ELECTRIC WAVE FILTERS UTILIZING PIEZOELECTRIC RESONATORS

Original Filed Feb. 28, 1957

3 Sheets-Sheet 1

INVENTOR.
ANTONIO LUNGO
BY
[signature]
ATTORNEY

INVENTOR.
ANTONIO LUNGO
BY
Francis R. [signature]
ATTORNEY

ELECTRIC WAVE FILTERS UTILIZING PIEZOELECTRIC RESONATORS

Original Filed Feb. 28, 1957 3 Sheets-Sheet 3

*INVENTOR.*
ANTONIO LUNGO
BY
Francis L. Masselle
ATTORNEY

United States Patent Office 3,217,265

Patented Nov. 9, 1965

3,217,265
ELECTRIC WAVE FILTERS UTILIZING PIEZOELECTRIC RESONATORS

Antonio Lungo, Middleburgh Heights, Ohio, assignor to Clevite Corporation, a corporation of Ohio Continuation of application Ser. No. 643,130, Feb. 28, 1957. This application July 17, 1963, Ser. No. 296,423
20 Claims. (Cl. 330—21)

This invention relates to wave filters, particularly to frequency selective filters of the type known in the art as "band pass" filters.

This application is a continuation of my application Serial No. 643,130, filed Feb. 28, 1957, and now abandoned.

Band pass filters have long been known in the art and conventionally, depending on the degree of sensitivity, bandwidth, and other characteristics required, most frequently consist of various assemblages of capacitors and inductors appropriately tuned and connected to form networks operative for the intended applications. Also known to the art are several types of electromechanical filters which consist wholly of or include as an essential component, an electromechanical transducer which may be a section of piezoelectric material, such as quartz, or a magnetostrictive element.

Filters utilizing exclusively electrical or electromagnnetic components, viz., capacitors and inductors, have the disadvantage of being relatively bulky—as viewed in the light of the modern trend toward miniaturization of equipment—and furthermore, particularly in the higher quality filters, require comparatively large numbers of elements connected in complex networks. Electromechanical filters, on the other hand, while also bulky in some varieties, are handicapped by one or more various additional disadvantages including high cost, high insertion losses, narrow bandwidth and/or asymmetrical response.

The fundamental object of the present invention is the provision of novel electric wave filters which overcome one or more of the disadvantages or comparable prior art devices.

More specifically, it is an object of the invention to provide improved electric wave filters which are compact and rugged in construction, are easily and inexpensively fabricated and are characterized by low insertion loss and high selectivity.

Another object is the provision of improved band pass filters adapted particularly, but not exclusively, for intermediate frequencies and having relatively broad and highly symmetrical pass-bands and a pole of attenuation at both the upper and lower limit of the pass-band.

These and additional objects and the manner of their fulfillment will become apparent to those conversant with the art as this description proceeds.

The details of the invention will be described as applied to intermediate frequency transistor amplifiers as a preferred example of the practical utility of the present invention.

Figure 1:
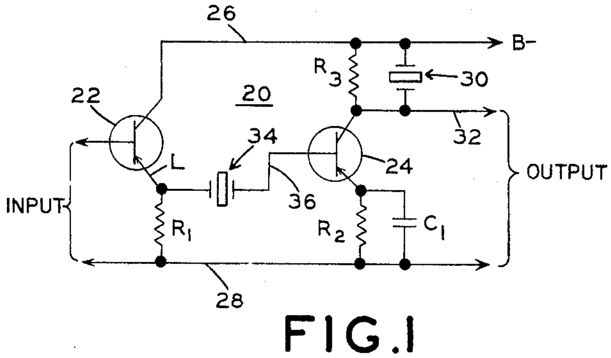
FIGURE 1 is a schematic circuit diagram of a filter network embodying one form of the present invention.
Figure 3:
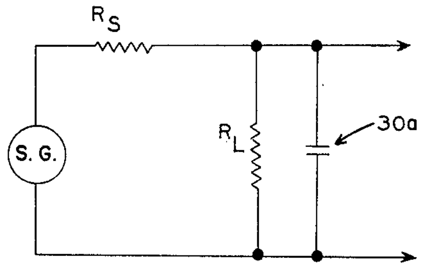
Figures 4, 6:
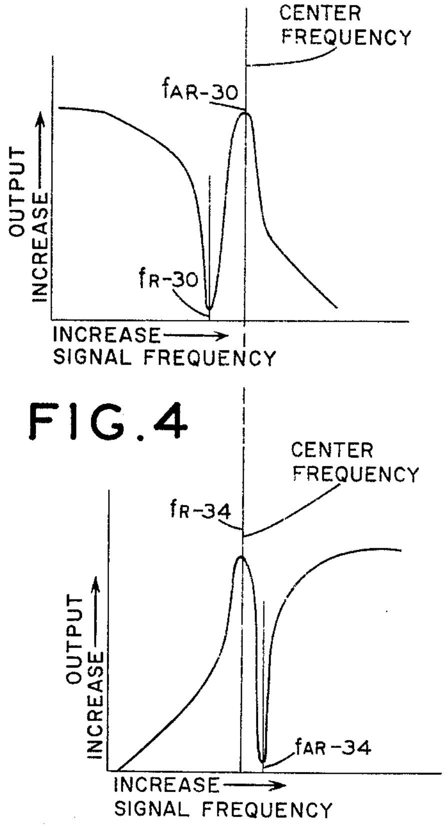
Figure 5:
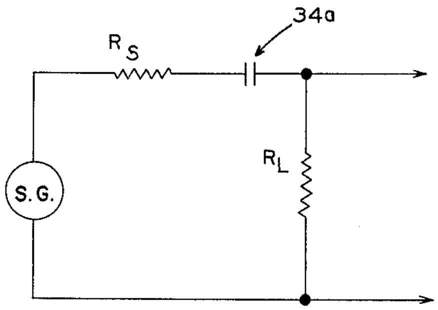
Figure 7:
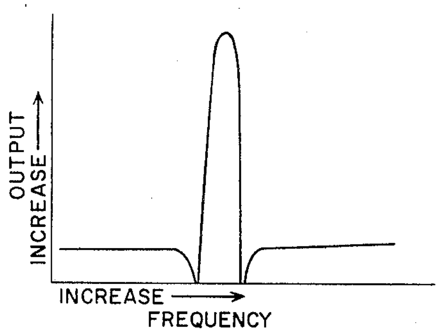
Figure 8:
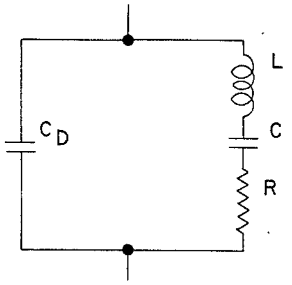
Figure 9:
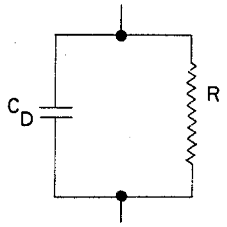
Figure 10:
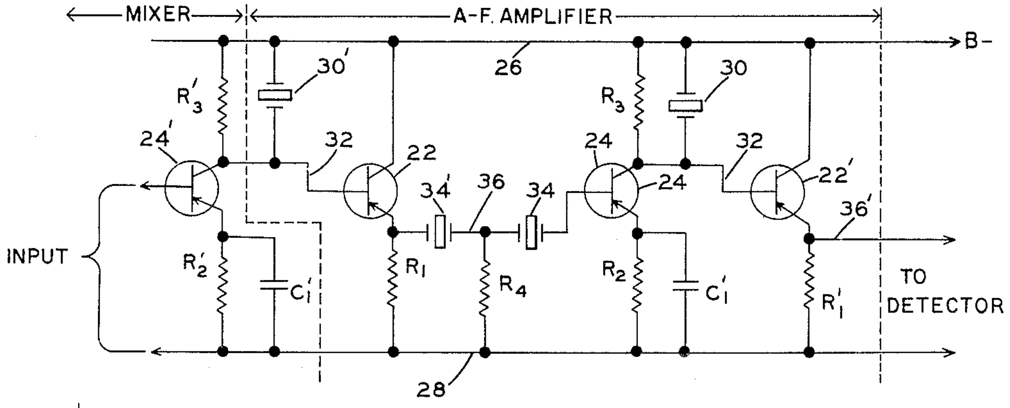
Figure 11:
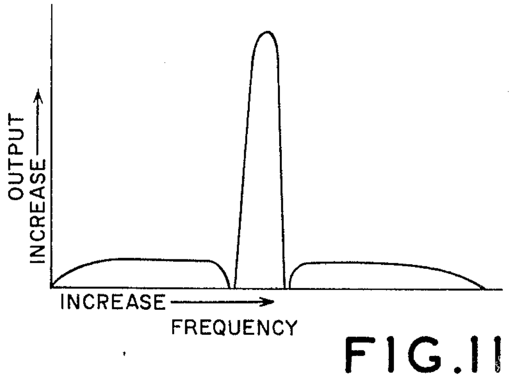
Figure 14:
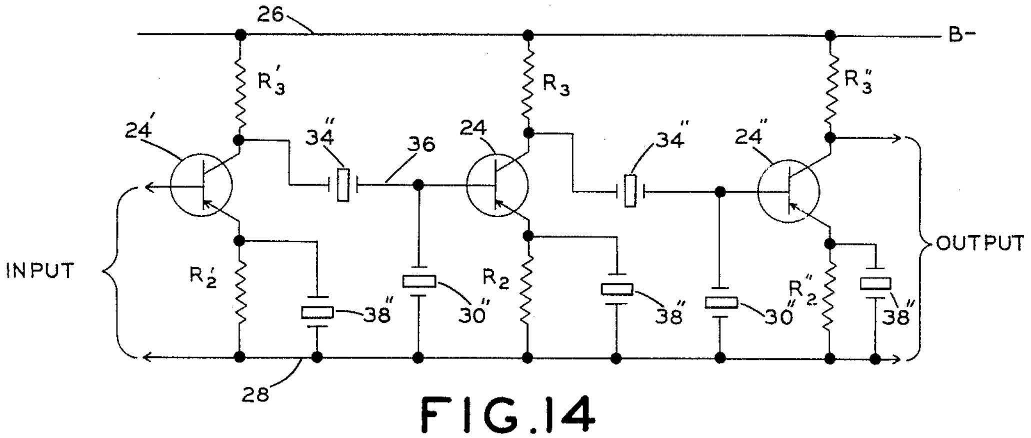
Figure 13:
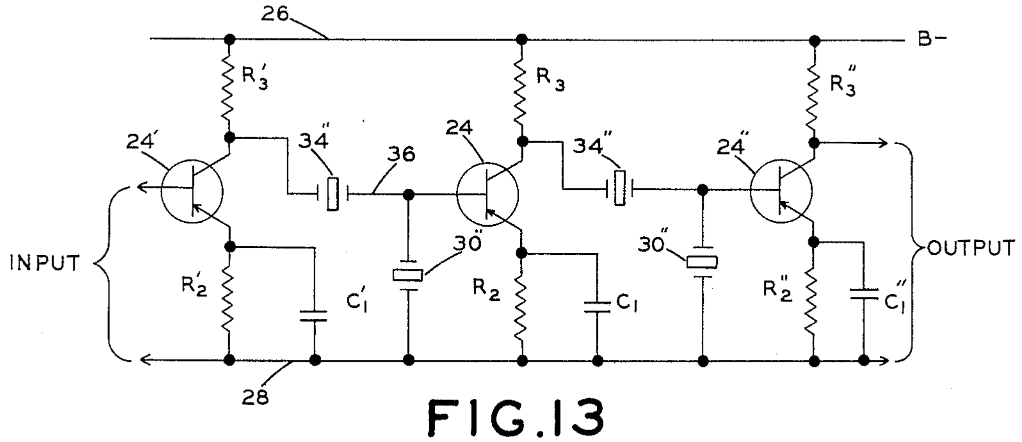
Figure 12:
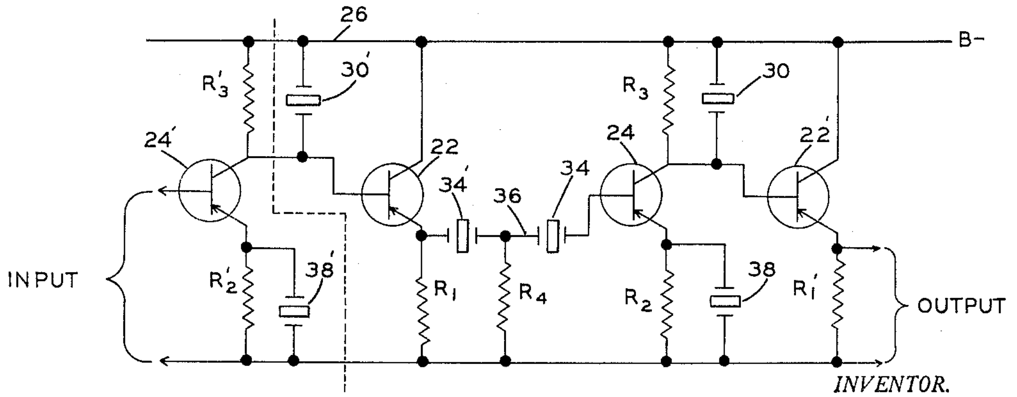

FIGURES 3 and 4, respectively, are a partial equivalent circuit diagram of one section of the network shown in FIGURE 1 and a graphical representation of the frequency response of said partial equivalent circuit;

FIGURES 5 and 6, respectively, are a partial equivalent circuit diagram of another section of the network shown in FIGURE 1 and a graphical representation of its frequency response;

FIGURE 7 is a graphical representation of the frequency response of the entire network shown in FIGURE 1;

FIGURE 8 is an equivalent circuit for an electromechanical transducer employed in filters according to the invention;

FIGURE 9 is an equivalent circuit corresponding to that shown in FIGURE 8 at a condition of series resonance;

FIGURE 10 is a schematic circuit diagram, with conventional power supply and bias connections omitted for simplicity, illustrating the invention as applied to the I.-F. amplifier stages of a transistorized superheterodyne radio receiver;

FIGURE 11 is a graphical representation of the frequency response characteristics of the FIGURE 10 circuit; and FIGURES 12, 13 and 14 are schematic circuit diagrams, similar to FIGURE 10, showing modified forms and applications of the invention.

Refering now to the drawings and first particularly to FIGURE 1, there is shown a two-stage amplifier 20 employing as current conducting means, a pair of the transistor triodes 22 and 24. In the illustrated embodiment transistors 22 and 24 are identical P-N-P junction type transistors but it will be appreciated that, with appropriate changes in bias connections, two N-P-N transistors or one of each type can be used. Furthermore, while the amplifier 20 consists of a grounded collector stage followed by a grounded emitter stage, as presently described, this particular arrangement is also subject to variation in accordance with the particular requirements of the intended application.

Transistors 22 and 24 each comprise a respective emitter, collector and base electrode represented by conventional symbols throughout the drawings. In circuit 20, FIGURE 1, the first stage comprises transistor 22 connected in a grounded collector circuit. The collector of transistor 22 is connected directly to a suitable source of bias potential, B—, by conductor 26. The emitter is coupled, through a resistor $R_1$, to conductor 28. The input signal to the first stage is applied between the base electrode and the emitter and the output signal is developed across resistor $R_1$.

The second stage of circuit 20 comprises transistor 24 which has its emitter connected to conductor 28 through a resistor $R_2$ shunted by a by-pass capacitor $C_1$. The collector of transistor 24 is connected to the negative power supply terminal B— through a series impedance, viz., resistor $R_3$. A choke coil or other impedance may be may be used in place of resistor $R_3$, i.e., the impedance need not be purely resistive.

As thus far described, the circuit shown in FIGURE 1 is a generally conventional two stage amplifier comprising a grounded collector stage feeding a grounded emitter stage.

In accordance with the present invention, an electromechanical transducer element 30 is connected in parallel with impedance $R_3$ between conductor 26 and an output lead 32 extending from the collector of transistor 24 to the next stage or the signal utilization point (not shown). In addition, a second electromechanical transducer element 34 is interposed in a conductor 36 coupling the emitter of the first stage transistor 22 to the base of the second stage transistor 24. Transducer 30 jointly with resistor $R_3$ constitutes the load impedance of transistor 24. Inasmuch as transducers 30 and 34 are, respectively, in series in and shunt-connected across the signal translation path, for ease of reference they may be referred to hereinafter as the "series" and "shunt" transducers, respectively.

It will be appreciated that the load impedance seen by transistor 22 consists of a parallel combination of (1) transducer 34 in series with the input impedance of transistor 24 and (2) impedance $R_1$. However, inasmuch as $R_1$ is present only to provide a D.-C. path to the emitter of transistor 22, it will not be considered as part of the load impedance for the purposes of this description and the subjoined claims. The load impedance seen by transistor 24, comprises the parallel combination of (1) impedance $R_3$, (2) transducer 30 and (3) the input impedance of the following stage (none shown in FIGURE 1). For ease of designation, $R_3$ may be referred to as the load impedance of transistor 24 for the purposes of this description and the subjoined claims.

Electromechanical transducers 30 and 34 and all others hereinafter mentioned are piezoelectric resonators. In the preferred form of the invention, electromechanical transducer elements 30 and 34, as well as all others hereinafter mentioned, comprise thin disks of a polycrystalline ferroelectric ceramic material capable of accepting and retaining a substantial amount of remanent electrostatic polarization. In addition, the ceramic material is preferably characterized by a relatively high radial (or planar) electromechanical coupling coefficient and by a high dielectric constant and mechanical Q.

While the desiderata specified for the material forming the ceramic disks are sometimes in conflict (i.e., all properties are not present to the optimum degree in any one material) several ferroelectric ceramics suiting the requirements of the invention are known at the present time. Among the best known and most satisfactory materials for the purpose at hand are a class of ceramic compounds and solid solutions of compounds referred to in the art and hereinafter as "the titanate" or "titanate-type" ceramics. Important examples of the titanates are barium titanate ($BaTiO_3$) and lead zirconate titanate [$Pb(ZrTi)O_3$]. The preferred materials among those presently known for the purposes of the invention are barium titanate containing about 12 weight percent calcium titanate.

These ceramic materials and various chemical modifications, as well as many others known in the ceramic art, have certain properties in common: they have a "perovskite" type lattice structure, are ferroelectric and, when poled by the application of a high D.-C. field, acquire and retain electromechanical transducing properties which are similar or identical to piezoelectricity.

Further details as to the composition, production and polarization of titanate ceramics may be had by reference to U.S. Letters Patent 2,486,560 to R. B. Gray and 2,708,244 to B. Jaffe. Additional information as to novel and improved ceramics well-suited to the purposes of the present invention is disclosed in copending applications, Serial Nos. 527,712 and 527,720, filed August 11, 1955, now U.S. Patent 2,928,163 and U.S. Patent 2,906,710, respectively, assigned to the same assignee as the present invention.

The ceramic disks comprised by transducer elements 30 and 34 are fabricated in accordance with the knowledge in the art as exemplified by the patents to Gray and B. Jaffe and are poled in the thickness or axial direction. This is accomplished by applying conductive electrodes to the respective disk faces and connecting the electrodes across the source of poling voltage.

When completed the transducer elements 30 and 34, in their preferred configuration, appear as thin ceramic disks having electrodes covering each face and having a lead wire soldered or otherwise suitably connected to each electrode. Such disks respond to A.-C. signals applied to the electrodes by vibration in the radial mode.

Figure 2:
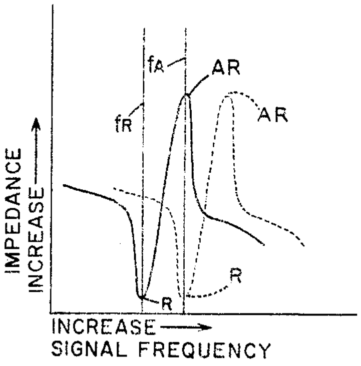
FIGURE 2 is a graphical representation of the impedance behavior of an electromechanical transducer of one type utilized in the present invention.

The variation of the impedance of a disk with frequency is shown by the solid line curve in FIGURE 2 from which it will be noted that there is a sharp minimum point R, which occurs at the resonant frequency $f_R$, and a sharp maximum peak AR which occurs at the anti-resonant frequency $f_A$. The resonant frequency of a thin disk in the radial mode is a function of its diameter. Therefore, a desired $f_R$ can be obtained by appropriate proportioning of the disk.

In accordance with the present invention disk 34 is proportioned to have a resonance, fundamental or overtone, of mechanical vibrations in the radial mode at a preselected frequency substantially coinciding with the center frequency of the pass band; for example, 455 kc. for an I.-F. filter. Disk 30 is proportioned so that its anti-resonance occurs at the same frequency, i.e., at the resonant frequency of disk 34, viz., 455 kc. The relation in the impedance behavior of disks 30 and 34 thus obtained is shown in FIGURE 2 wherein the solid line curve represents the impedance of disk 30 and the broken line curve represents the impedance of disk 34.

In describing the operation of the circuit shown in FIGURE 1, the second stage, comprising transistor 24 and disk 30 will first be considered separately inasmuch as this single stage is susceptible of satisfactory independent operation. Being proportioned so that its anti-resonant frequency corresponds, at least substantially, to the center frequency of the pass-band, disk 30 has a maximum impedance at this frequency. At this point, disk 30 does not load the resistor $R_3$ and maximum output occurs. All other frequencies materially above or below the pass-band are attenuated. Maximum attenuation occurs at the resonant frequency where the impedance of disk 30 is a minimum, thus loading resistor $R_3$.

From the foregoing it will be seen that there is a frequency of minimum attenuation at the center of the pass-band and a frequency of maximum attenuation which in this particular case occurs below the pass-band.

The width of the pass band is determined by the mechanical Q of the disk and the relative values of $R_3$ and the capacitive reactance, $X_c$, of the disk. The effective bandwidth varies directly with the value of $X_c$, i.e., an increase in $X_c$ results in an effective broadening of the pass band and, conversely, a decrease in $X_c$ effectively reduces the bandwidth. Variation of $X_c$ also affects the degree of attenuation of frequencies above and below the pass-band. In this particular case, an increase in $X_c$ diminishes the attenuation of frequencies outside the band and vice versa. However, regardless of the value of $X_c$, the insertion loss is negligible in the pass-band and is not primarily a function of the mechanical Q of the material.

Now, considering the entire circuit of FIGURE 1, the filter characteristics of disk 30 are significantly improved by the presence of disk 34 in the circuit.

Disk 34 is proportioned to have a resonance of mechanical vibrations in the radial mode substantially at the center frequency of the pass band and, therefore, coinciding with the anti-resonant frequency of disk 30. As shown in FIGURE 2, the impedance behavior of disk 34 is substantially the same as that of disk 30 except that the curve for disk 34, shown in dotted lines, is displaced to the right by an amount equal to the difference $(f_A-f_R)$; consequently, the point of minimum impedance of disk 34 occurs at the center frequency and the point of maximum impedance occurs above the pass-band. However, since disk 34 is connected in series with its load impedance, viz., the input impedance of the second stage, the relationship of impedance and attenuation provided by disk 34 are the reverse of those of disk 30. Thus, the anti-resonant frequency of disk 34 provides a point of maximum attenuation above the pass-band and the resonant frequency of disk 34 a point of minimum attenuation in the center of the pass-band.

The insertion loss due to disk 34 is a function of the mechanical Q of the disk and can be kept to less than .5 db with proper attention to design of the disk and circuit.

The functioning of disks 30 and 34, individually and in concert, will best be understood from a consideration of FIGURES 3, 4, 5 and 6.

FIGURE 3 is a partial equivalent circuit diagram of the second stage of the FIGURE 1 circuit, including the shunt disk which is identified by the reference numeral 30*a*. The equivalent circuit of the disk itself, hereinafter shown and described, is omitted from this figure. In the figure, $R_L$ represents the load impedance connected across a signal source S.G. through a series resistance $R_S$ which represents the impedance of the generator. The output-versus-frequency characteristic of the circuit in FIGURE 3 is shown in FIGURE 4 wherein it will be noted that maximum output occurs at $f_{AR-30}$, the anti-resonant frequency of disk 30*a*, and coincides with the center frequency of the pass-band.

Referring to FIGURE 5, there is shown a partial equivalent circuit diagram representing the first stage of the FIGURE 1 circuit, including the series disk which is identified by the reference numerals 34*a*. In the figure, S.G. represents a signal source feeding a load impedance $R_L$ (which would be the input impedance of the second stage). In series with the load impedance are disk 34*a* and resistor $R_S$ representing the impedance of the generator. The output-versus-frequency characteristic of the FIGURE 5 circuit is shown in FIGURE 6 wherein it will be noted that the maximum output occurs at $f_{R-34}$ the resonant frequency of disk 34*a*, and coincides with the center frequency of the pass-band. Comparing FIGURES 4 and 6 it will also be noted that the former shows a pole of attenuation, at $f_{R-30}$, which is below the center frequency and FIGURE 6 shows a pole of attenuation, at $f_{AR-34}$, which is above the center frequency.

FIGURE 7 illustrates the frequency response of the circuit shown in FIGURE 1. The two frequencies of maximum attenuation can be seen at either side of the pass-band.

The design of circuits in accordance with the present invention requires consideration of the electrical characteristics of the disks 30 and 34. The well-known electrical equivalent circuit of a disk or, for that matter, any piezoelectric body, is shown in FIGURE 8. It consists of an inductance L, capacitance C and resistance R which are the electrical equivalents, respectively, of the mass, compliance and series resistance of the disk. L, C and R are shunted by a capacitor $C_D$ which represents the electrical capacity of the disk.

When the reactance $X_L$ of inductance L equals the reactance $X_c$ of capacitance C, the disk is at resonance and the equivalent circuit becomes as shown in FIGURE 9. Starting with the equivalent circuit of FIGURE 9 and knowing R and C, the series impedance of disks having having a low mechanical Q can be evaluated. For disks having a high mechanical Q, the series impedance would be equal to series resistance R.

When the reactance $X_L$ minus $X_c$ equals the reactance of $C_D$, the disk is at anti-resonance and presents a high electrical impedance as hereinbefore explained. The electrical impedance can be evaluated from $f$, $C_D$, L, C and mechanical Q in a manner well known in the art.

FIGURE 10 shows a further embodiment of the invention as applied to the I.-F. amplifier stage of a transistorized superheterodyne radio receiver. It will be noted that portions of this circuit are identical to that in FIGURE 1 and, therefore, parts in common have been assigned the same reference characters and in the case of corresponding or duplicated parts, primed reference characters are used. This system of designation is adhered to throughout the remainder of the description wherever applicable.

In FIGURE 10, the circuit shown, comprises a mixer stage, as indicated, utilizing a transistor 24′ with a grounded emitter connection. A shunt transducer 30′, designed to have its anti-resonant frequency at the center of the pass-band, is connected in parallel with the load impedance consisting of resistor $R_3'$ and the input impedance of transistor 22 in the same manner as transducer 30. The output from the mixer stage transistor 24′ feeds a first amplification stage comprising transistor 22, having a grounded collector as already described in conjunction with FIGURE 1. The first I.-F. amplification stage and the second I.-F. amplification stage, also previously described, are coupled by a pair of series transducers 34′ and 34 interposed between the emitter of transistor 22 and the base of transistor 24. Both transducers 34′ and 34 have a resonant frequency at the center of the pass-band. A resistor $R_4$ connecting the common point of transducer 34′ and 34 to conductor 28 provides the load for transducer 34′. The remainder of the circuit is substantially as shown in and described in conjunction with FIGURE 1.

As well known in the art, maximum powder transfer between stages requires optimum matching of impedances between the output of one stage and the input of the next. Referring to FIGURE 10, the grounded emitter transistor 24′ has a high output impedance matching the high input impedance of transistor 22 at signal frequencies which drive shunt transducer 30′ at anti-resonance where its impedance is a maximum. At other frequencies, transducer 30′ has low impedance and effectively short circuits $R_3'$, thus creating a mismatch between the output impedance of transistor 24′ and the input impedance of transistor 22. Consequently, maximum power transfer occurs only at the pass-band frequencies.

The grounded collector transistor 22 has a low output impedance and this is matched to the input of the following transistor 24 by transducers 34 and 34′ because these series transducers are resonant at the center frequency and present a low impedance. An example of the values of circuit constants for the FIGURE 10 circuit are as follows.

Transistors:
- 22, 22′, 24, 24′—PNP junction type (Raytheon CK–706/2N112)

Transducers:
- 30, 30′—Thin disks of lead zirconate titanate [Pb $(Zr_{0.54}Ti_{0.46})O_3$] ceramic containing 1 weight percent niobium oxide and having an anti-resonant frequency of 455 kc.
- 34, 34′—Thin disks of lead zirconate titanate [Pb$(Zr_{0.54}Ti_{0.46})O_3$] ceramic containing 1 weight percent niobium oxide and havig a resonant frequency of 455 kc.

Resistors:

| | Kilohms |
|---|---|
| $R_1$, $R_1'$, $R_3$, $R_3'$ | 10 |
| $R_2$, $R_2'$, $R_4$ | 1.2 |

Capacitors:

| | | |
|---|---|---|
| $C_1$, $C_1'$ | microfarad | .05 |
| B— voltage | volts | 12 |

The operating characteristics of the circuit as described above will be apparent from the typical response curve shown in FIGURE 11. Power gains ranging to 73 db have been achieved with such a circuit.

FIGURE 12 shows the mixer and I.-F. amplifier stages of a transistorized superheterodyne radio receiver embodying series and shunt transducers as shown in FIG. 10 and also embodying in the emitter-to-ground path of each grounded emitter stage a transducer which is series resonant at the center frequency of the pass band, in accordance with the present invention.

The circuit shown in FIGURE 12 is identical to that of FIG. 10, except that the by-pass capacitors $C_1$ and $C_1'$, in the latter are replaced by transducers 38 and 38′, respectively, in the emitter-to-ground path of each grounded emitter stage, embodying transistors 24 and 24′, respectively. Preferably, each of these transducers 38 and 38' is identical to the transducers 34 and 34', with a mechanical resonance, fundamental or overtone, at substantially the center frequency of the desired pass-band.

At their resonant frequency, the impedance of transducers 38 and 38' becomes a minimum as already explained for transducers 34 and 34'. Consequently at the center frequency the transducers 38 and 38' effectively short out the respective resistors $R_2$ and $R_2'$ thus reducing negative feedback to a minimum and resulting in maximum output. At all other frequencies, the input impedance of the transistors is a maximum and there is substantial negative feedback.

If desired, in accordance with the present invention the respective series-resonant transducer 38 or 38' may be connected in the emitter-to-ground path of a grounded emitter transistor amplifier stage in the absence of either or both of the other series-resonant transducer 34 or 34' in the input circuit of that stage and the parallel-resonant transducer 30 or 30' in the output circuit of that stage.

As previously mentioned, application of the invention is not limited to circuits, such as shown in FIGURES 10 and 12, wherein the successive stages alternate between grounded emitter and grouded collector transistor connections. A circuit made up entirely of high gain common emitter transistor stages is shown schematically in FIGURE 13. For sake of example, three stages have been illustrated, each comprising a respective transistor 24', 24 and 24''.

It will be noted from the schematic that each stage is identical and in each the respective emitter is common to the input and output circuit of its transistor. Thus, in the first stage, the input signal is fed in between the base and emitter of transistor 24' and the output from the transistor is derived between its emitter and collector. This is the case for each of the stages. In series with each emitter there is a resistive impedance $R_2'$, $R_2$ and $R_2''$ each by-passed by a respective shunt capacitor $C_1'$, $C_1$ and $C_1''$. Inasmuch as each stage of the circuit is the same and identical to the common emitter stages of the FIGURE 10 circuit already described in detail, repetition of such description is unnecessary to a full understanding of the physical and functional features of the circuitry. In accordance with this feature of the invention, an electromechanical transducer 34'', resonant at a preselected frequency (e.g., the center frequency of the desired pass-band) is coupled between the collector of transistor 24' and the base of the succeeding transistor, viz., 24, by a conductor 36. A second electromechanical transducer, 30'', anti-resonant at said preselected frequency, is connected between conductors 36 and 28 and therefore is common to and shunted across the output (emitter-collector) circuit of transistor 24', as well as the input (emitter-base) circuit of the second stage transistor, 24. This arrangement of transducers 30'' and 34'' may be repeated between the second and third stages, i.e., between transistors 24 and 24'', as shown in FIGURE 13. The electromechanical transducers 30'' and 34'' are the counterparts of 30 and 34 previously described and the disclosure made hereinbefore as to physical structure, operation and variations apply to all transducers referred to herein. Likewise the operation of the circuit in FIGURE 13 is the same as and will be readily understood from the general explanation given in connection with the first described embodiments.

The circuit illustrated in FIGURE 13 enables obtaining greater power gains by virtue of the fact that all high gain stages are employed. Moreover, this circuit may be modified to increase its selectivity, if desired, by replacing capacitors $C_1'$, $C_1$ and/or $C_1''$ with resonant transducers in the same manner as the FIGURE 10 circuit is modified to obtain that in FIGURE 12. The FIGURE 13 circuit, thus modified, is shown in FIGURE 14 wherein the resonant electromechanical transducers shunting resistive impedances $R_1'$, $R_1$ and $R_1''$ are all designated 38''. The circuit is otherwise identical in configuration to that of FIGURE 13 and, in operation, provides high power gain and increased selectivity.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An active filter network having an input, an output and a common terminal, and including a transistor having an input, a common and an output electrode, a first piezoelectric resonator of ferroelectric ceramic material exhibiting series resonance at a predetermined frequency, means coupling said first resonator in series with the input electrode-to-common electrode path through the transistor between said input and common terminals to introduce a first frequency dependent effect upon the transmission characteristic of said active filter, a second piezoelectric resonator of ferroelectric ceramic material exhibiting parallel resonance at said predetermined frequency coupled to said output electrode and to said output terminal to introduce a second frequency dependent effect upon the transmission characteristic of said active filter.

2. A band-pass filter comprising, in combination, a plurality of transistor amplifier stages, a load impedance element coupled to the output of one of the amplifier stages, a first piezoelectric ceramic transducer element connected in parallel with said load impedance element and having a condition of anti-resonance at a frequency at substantially the center of the pass band, and a second piezoelectric ceramic transducer element coupled between said one amplifier stage and an adjacent amplifier stage and having a condition of resonance at a frequency which substantially coincides with that of the anti-resonance condition of said first electromechanical transducer.

3. A band-pass filter comprising: in combination, a cascade of transistor amplification stages; piezoelectric ceramic resonator means, anti-resonant at substantially the center frequency of the pass-band, shunt-connected across the output of at least one of said stages; and a second piezoelectric ceramic resonator means, resonant at substantially said frequency, coupled between at least said one stage and an adjacent stage.

4. A band-pass filter according to claim 3 wherein said resonator means comprise thin disks of a polarizable, ferroelectric ceramic material having a high dielectric constant, planar coupling coefficient and mechanical Q, said disks having electrode faces and remanent electrostatic polarization in the thickness direction.

5. An active filter network having an input, an output and a common terminal, and including an amplifying device having an input, a common and an output electrode, a first piezoelectric resonator exhibiting series resonance at a predetermined frequency, means coupling said input electrode, common electrode, and said resonator in series in the recited order between said input and common terminals in degenerative connection to introduce a first frequency dependent effect upon the transmission characteristic of said active filter, a second piezoelectric resonator exhibiting parallel resonance at said predetermined frequency coupled between said output electrode and said common terminal to introduce a second frequency dependent effect upon the transmission characteristic of said active filter.

6. An active filter network as set forth in claim 5 wherein said amplifying device is a transistor, said input, common, and output electrodes being respectively the base, emitter and collector electrodes of said transistor.

7. An active filter network as set forth in claim 5 wherein said resonator is a polycrystalline aggregate of ferroelectric piezoelectric material.

8. An active filter network having an input, a common, and an output terminal, and including an amplifying device having an input, a common and an output electrode, a first piezoelectric resonator exhibiting resonance and anti-resonance at two closely spaced frequencies, anti-resonance occurring at the higher of said two frequencies, means coupling said input electrode, common electrode, and said first resonator in series in the recited order between said input and common terminals respectively in degenerative connection to introduce a first frequency dependent effect upon the transmission characteristic of said active filter, a second piezoelectric resonator exhibiting resonance and anti-resonance at two closely spaced frequencies, anti-resonance occurring at the higher of these last mentioned frequencies, said second piezoelectric resonator being coupled between said output electrode and said common amplifier terminal to introduce a frequency dependent effect upon the transmission characteristic of said active filter, the resonant frequency of said first resonator and the anti-resonant frequency of said second resonator being substantially coincident to establish the frequency of the pass-band of said active filter, and the anti-resonant frequency of said first resonator and the resonant frequency of said second resonator establishing notches in the transmission characteristic of said active filter adjacent said pass-band.

9. An active filter as set forth in claim 8 wherein each said resonator is a polycrystalline aggregate of ferroelectric piezoelectric material.

10. An active filter network having an input, a common, and an output terminal, and including an amplifying device having an input, a common, and an output electrode, a first piezoelectric resonator exhibiting resonance and anti-resonance at two closely spaced frequencies, anti-resonance occurring at the higher of said two frequencies, said piezoelectric resonator exhibiting electrical capacity therein, means coupling said input electrode, common electrode and said first resonator in series in the recited order between said input and common terminals respectively in degenerative connection to introduce a first frequency dependent effect upon the transmission characteristic of said active filter, a second piezoelectric resonator exhibiting resonance and anti-resonance at two closely spaced frequencies, anti-resonance occurring at the higher of these last mentioned frequencies, said second resonator exhibiting electrical capacity therein, said second piezoelectric resonator being coupled between said output electrode and said common amplifier terminal to introduce a frequency dependent effect upon the transmission characteristic of said active filter, the resonant frequency of said first resonator and the anti-resonant frequency of said second resonator being substantially coincident to establish the frequency of the passband of said active filter, the anti-resonant frequency of said first resonator and the resonant frequency of said second resonator establishing notches in the transmission characteristic of said active filter adjacent said passband, the transmission characteristic of said first resonator below the passband providing substantial compensation against the deleterious shunting effect of the capacity of said second resonator, and the transmission characteristic of said second resonator above the passband providing compensation against the deleterious shunting effect of the capacity of said first resonator.

11. An active filter network as set forth in claim 10 wherein said amplifying device is a transistor, said input, common, and output electrodes being respectively the base, emitter, and collector electrodes of said transistor, and each said piezoelectric resonator is of a polycrystalline ferro-electric piezoelectric material.

12. An active filter network having an input, a common, and an output terminal, and including an amplifying device having an input, a common, and an output electrode, a first piezoelectric resonator of polycrystalline ferroelectric material exhibiting resonance and anti-resonance at two closely spaced frequencies, anti-resonance occurring at the higher of said two frequencies, said piezoelectric resonator exhibiting electrical capacity therein, means coupling said input electrode, common electrode and said first resonator in series in the recited order between said input and common terminals respectively in degenerative connection to introduce a first frequency dependent effect upon the transmission characteristic of said active filter, a second piezoelectric resonator of polycrystalline ferroelectric material exhibiting resonance and anti-resonance at two closely spaced frequencies, anti-resonance occurring at the higher of these last mentioned frequencies, said second resonator exhibiting electrical capacity therein, said second piezoelectric resonator being coupled between said output electrode and said common amplifier terminal to introduce a frequency dependent effect upon the transmission characteristic of said active filter, the resonant frequency of said first resonator and the anti-resonant frequency of said second resonator being substantially coincident to establish the frequency of the passband of said active filter, the anti-resonant frequency of said first resonator and the resonant frequency of said second resonator establishing notches in the transmission characteristic of said active filter adjacent said passband, the transmission characteristic of said first resonator below the passband providing substantial compensation against the deleterious shunting effect of the capacity of said second resonator, and the transmission characteristic of said second resonator above the passband providing compensation against the deleterious shunting effect of the capacity of said first resonator.

13. In an amplifier stage having an input, an output and a common terminal the combination comprising: a transistor defining a low input impedance and having an input electrode, an output electrode and a common electrode; circuit means coupling the input terminal of the amplifier stage to said input electrode of said transistor; circuit means couping said output electrode of said transistor to the output terminal of the amplifier stage; a frequency sensitive parallel circuit consisting of two circuit branches coupled between said common electrode of said transistor and the common terminal of the amplifier stage; an electrical resistance connected in one of said circuit branches; and an electromechanical resonator of ferroelectric ceramic material connected in the other of said circuit branches, said resonator being series resonant at a predetermined signal frequency to effectively short circuit said resistance to minimize negative feedback in said amplifier stage and the input impedance of said amplifier stage at signal frequencies in the immediate vicinity of said predetermined frequency.

14. In an amplifier stage as claimed in claim 13 wherein a second electromechanical resonator of ferroelectric ceramic material is connected in series with said input electrode of said transistor and the input terminal of the amplifier, said second resonator exhibiting series resonance at said predetermined frequency.

15. In an amplifier stage as claimed in claim 14 wherein a third electromechanical resonator of ferroelectric ceramic material is coupled between said output electrode and the common terminal of the amplifier stage, said third electromechanical resonator exhibiting parallel resonance at said predetermined frequency.

16. A band-pass filter comprising: a cascade of transistor amplification stages each of which has an input and output and comprises a low impedance junction transistor having base, emmitter and collector electrodes, the power transfer between adjacent stages being maximum when the input impedance of a stage matches the output impedance of a preceding stage; circuit means connecting the transistor in at least one intermediate stage with its emitter common to the input and ouput of said one stage; a frequency sensitive circuit consisting of two parallel circuit branches connected in series with said emitter of said one stage; an electrical resistance connected in one of said circuit branches; and an electromechanical resonator of ferroelectric ceramic material connected in the other said circuit branches, said resonator being resonant at a predetermined signal frequency to effectively short circuit said resistance to minimize the input impedance of said one stage at signal frequencies in the immediate vicinity of said predetermined frequency, the input impedance of said one stage being substantially matched with the output impedance of a preceding stage at signal frequencies in the immediate vicinity of said predetermined frequency.

17. A band-pass filter comprising, in combination, a cascade of transistor amplification stages each of which comprises a junction transistor having an emitter, collector and base, the transistor in successive stages being connected alternately with grounded emitter and grounded collector; a piezoelectric ceramic transducer coupling the emitter of one transistor having a grounded collector to the base of the succeeding grounded emitter transistor; a load impedance element in the collector circuit of one transistor having a grounded emitter; and a second piezoelectric ceramic transducer shunted across said load impedance, the first-mentioned transducer being resonant at a preselected frequency and said second transducer being anti-resonant at said preselected frequency.

18. A band-pass filter according to claim 17 including a resistive impedance in series with the emitter of said grounded emitter transistor and an additional piezoelectric ceramic transducer, resonant at said preselected frequency, shunt-connected across said resistive impedance.

19. A band-pass filter comprising, in combination, a cascade of transistor amplification stages each of which includes a junction transistor having an emitter, collector and base, at least two transistors in successive stages being connected with their respective emitters common to the respective input and output circuits of said successive stages, a piezoelectric ceramic transducer, resonant at a preselected frequency, directly coupling the base of one of said two transistors to the collector of the other; and a second piezoelectric ceramic transducer, anti-resonant at said preselected frequency shunting both the output circuit of the first of said two transistors and the input circuit of the succeeding transistor.

20. A band-pass filter comprising: four junction transistors connected in a cascade, the first and third stages of the cascade each having a respective transistor connected with its emitter common to the input and output of the stage, the second and fourth stages each having a respective transistor connected with its collector common to the input and output of the stage, and four electromechanical resonators each consisting of a thickness-polarized, radial-mode, vibratory element of ferroelectric ceramic material, two of said resonators have a resonant frequency substantially centered in the passband and the other two being anti-resonant at substantially said frequency, one of each of said anti-resonant resonators being shunted across the signal path between said first and second and between said third and fourth stages of the cascade, the resonant resonators being connected in series and coupled between said second and third stages of the cascade.

References Cited by the Examiner

UNITED STATES PATENTS 2,280,605 4/42 Roberts ------------ 333—72 X

ROY LAKE, *Primary Examiner.*

NATHAN KAUFMAN, *Examiner.*

UNITED STATES PATENT OFFICE

CERTIFICATE OF CORRECTION

Patent No. 3,217,265 November 9, 1965

Antonio Lungo

It is hereby certified that error appears in the above numbered patent requiring correction and that the said Letters Patent should read as corrected below.

Column 2, line 23, for "Refering" read -- Referring --; line 52, strike out "may be"; column 5, line 52, strike out "having"; column 6, line 17, for "powder" read -- power --; line 40, for "CK-706/2N112)" read -- CK-760/2N112) -- same column 6, line 49, for "havig" read -- having --; column 10, line 42, for "couping" read -- coupling --.

Signed and sealed this 20th day of September 1966.

(SEAL)
Attest:

ERNEST W. SWIDER
Attesting Officer

EDWARD J. BRENNER
Commissioner of Patents